United States Patent [19]
Gardner

[11] Patent Number: 5,308,633
[45] Date of Patent: May 3, 1994

[54] METHOD FOR FORMING DOUGH SHEETS WITH LATTICE-WORK APPEARANCE

[76] Inventor: Thomas J. Gardner, State Rte. 41 and Lenox Rd., Richmond, Mass. 01254

[21] Appl. No.: 61,154

[22] Filed: May 12, 1993

Related U.S. Application Data

[62] Division of Ser. No. 923,262, Jul. 31, 1992, Pat. No. 5,244,374.

[51] Int. Cl.$^5$ .............................. A21D 6/00; A23P 1/00
[52] U.S. Cl. .................................. 426/503; 426/391; 426/512; 426/518
[58] Field of Search ............... 426/496, 502, 503, 512, 426/514, 517, 518, 94, 104, 391; 99/450.1, 450.3

[56] References Cited

U.S. PATENT DOCUMENTS

| | | | |
|---|---|---|---|
| 2,345,045 | 3/1944 | Harriss et al. | 425/385 |
| 2,405,661 | 8/1946 | MacManus | 425/290 |
| 2,453,599 | 11/1948 | Schlegel | 30/114 |
| 2,495,553 | 1/1950 | Shaw | 425/290 |
| 2,618,852 | 11/1952 | Clough | 426/503 |
| 2,666,401 | 1/1954 | McQuaid | 425/289 |
| 2,791,029 | 5/1957 | Henneberger | 426/503 |
| 2,915,823 | 12/1959 | Wohlfeil | 30/306 |
| 3,026,823 | 3/1962 | Wilcox | 425/293 |
| 3,171,315 | 3/1965 | Jahn | 83/331 |
| 3,744,404 | 7/1973 | Eisendrath et al. | 425/290 |
| 3,754,327 | 8/1973 | Lisa | 426/503 |
| 4,075,359 | 2/1978 | Thulin | 426/503 |
| 4,618,498 | 10/1986 | Thulin | 426/503 |
| 4,678,418 | 7/1987 | Thulin | 425/291 |
| 4,789,555 | 12/1988 | Judd | 426/503 |

*Primary Examiner*—George Yeung
*Attorney, Agent, or Firm*—Fay, Sharpe, Beall, Fagan, Minnich & McKee

[57] ABSTRACT

A method and apparatus for treating a sheet of pastry dough to cause it to have a woven, lattice-work appearance by cutting a plurality of polygonal openings through the sheet in a predetermined pattern with sides of each opening being aligned with sides of adjacent openings to produce aligned rows of openings and deforming the sheet in the portions remaining between the openings by depressing grooves aligned with sides of the openings into the sheet to make it appear that the sheet is comprised of overlapping dough strips.

4 Claims, 3 Drawing Sheets

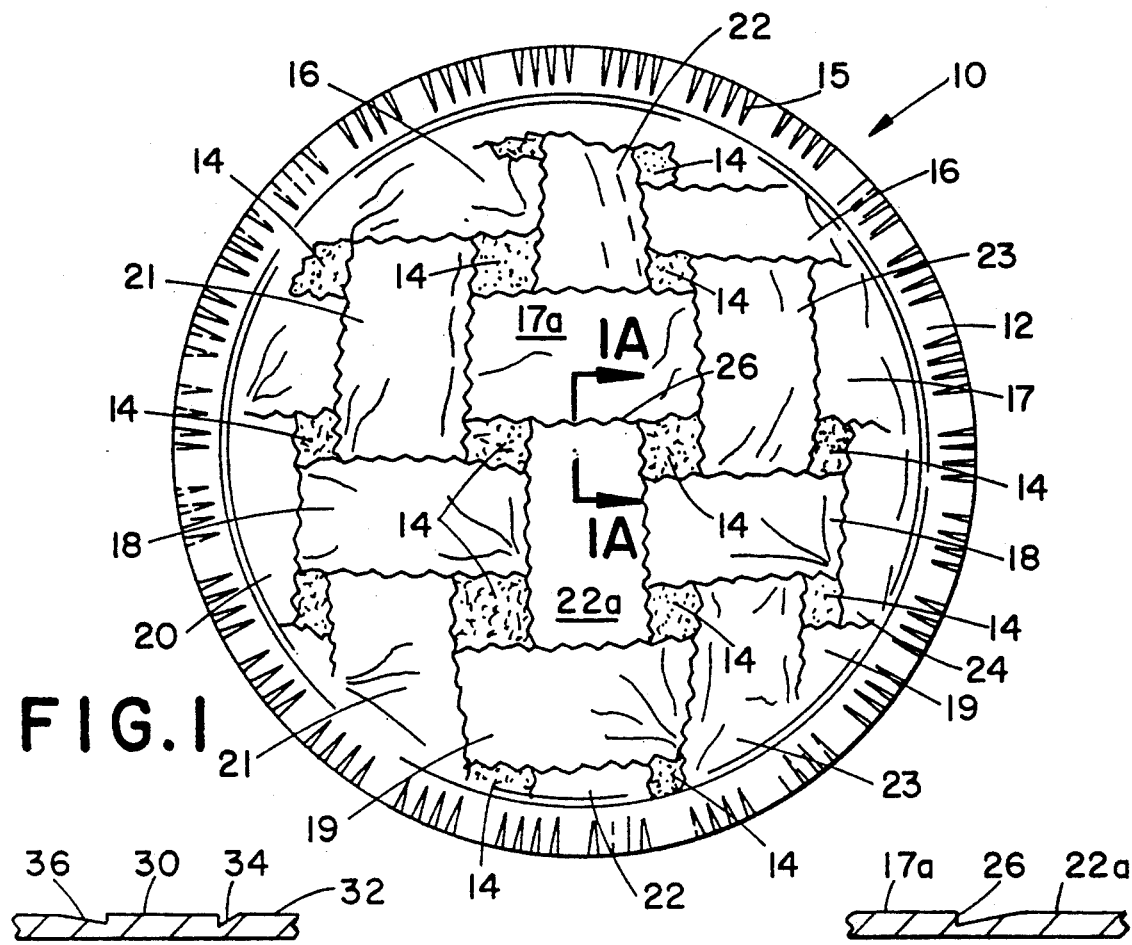
FIG.1
FIG.2A
FIG.1A
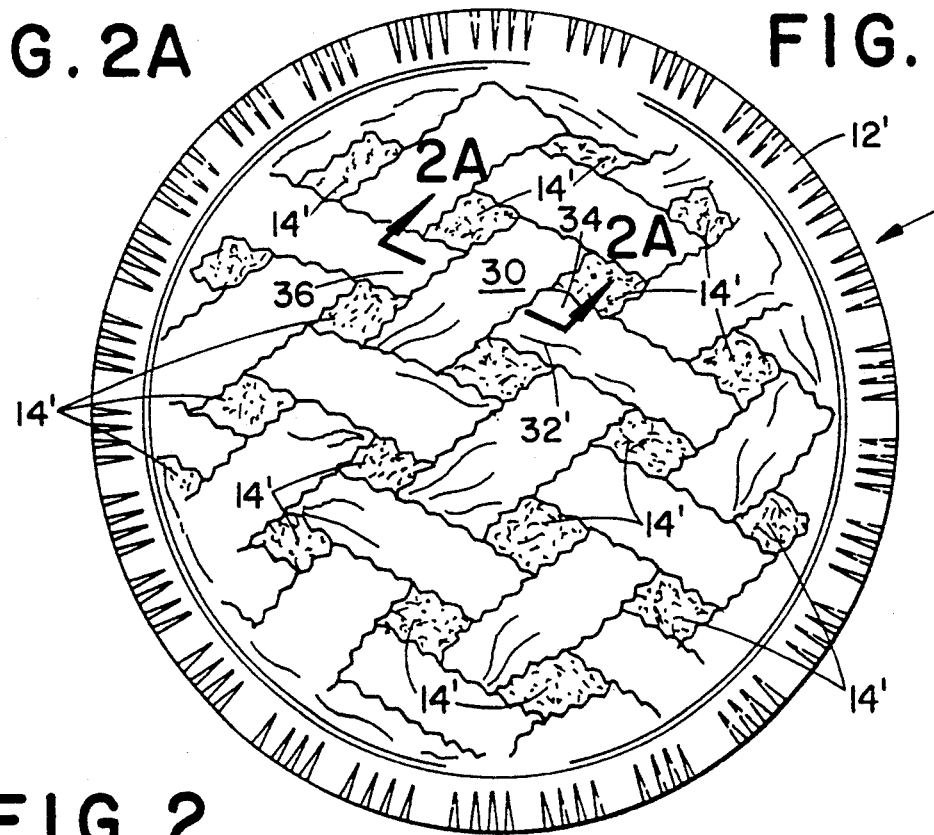
FIG.2

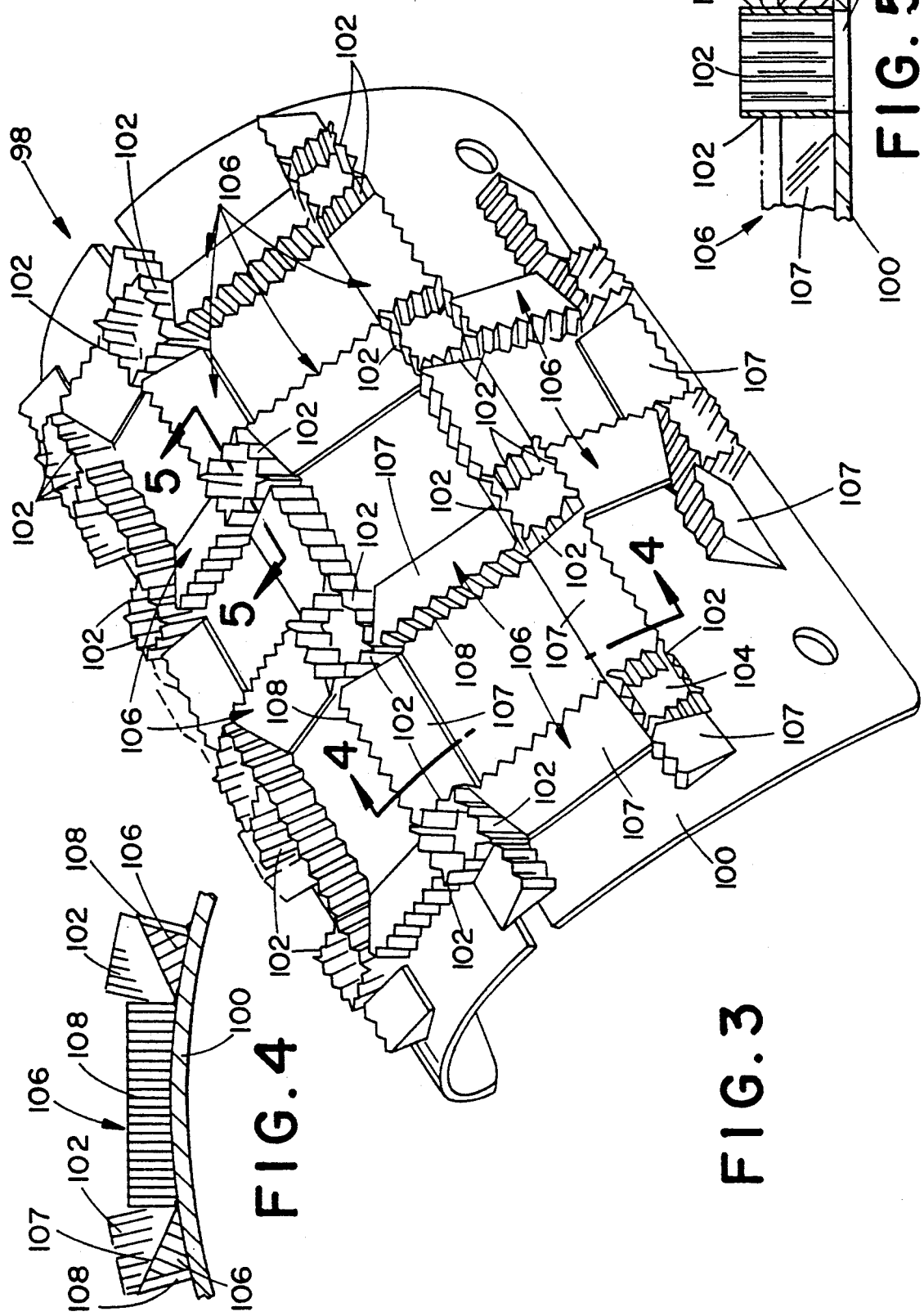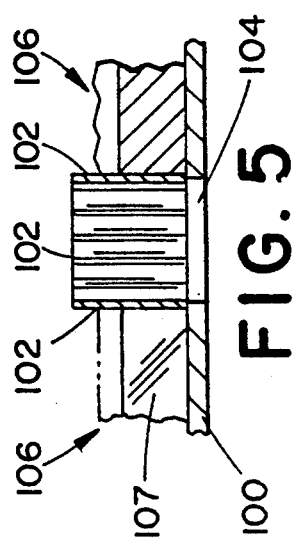

5,308,633

METHOD FOR FORMING DOUGH SHEETS WITH LATTICE-WORK APPEARANCE

This application is a divisional of Ser. No. 07/923,262, filed Jul. 31, 1992 now U.S. Pat. No. 5,244,374.

BACKGROUND OF THE INVENTION

The subject invention is directed toward the art of producing pastry products and, more particularly, to a method and apparatus for treating a single layer sheet of pastry dough to give it the appearance of having been woven from a plurality of individual strips.

The invention is particularly intended for use in forming the top crust of pies and will be described with reference thereto; however, the invention is capable of broader application and could be used whenever it is desired to produce a pastry product having the noted appearance.

The use of a lattice-work top crust on certain types of pies, especially fruit pies, is somewhat traditional and produces a particularly attractive pie. Typically, such crusts have been produced by forming flat pastry strips which are then manually woven into an open basket-weave pattern. The process is, of course, comparatively time consuming. Thus, it is relatively uneconomic to use such crusts on high volume bakery produced pies.

In an effort to mechanize the production of the crusts, a variety of cutters and punching devices have been proposed. The pie crusts resulting from the use of these prior devices do not, however, have a true woven appearance. Rather, they look like what they are, namely, flat sheets of pastry dough with a pattern of holes punched therethrough. Consequently, there as been an ongoing need to provide apparatus and method for efficiently and effectively producing crusts having the desired appearance.

BRIEF DESCRIPTION OF THE INVENTION

The subject invention provides a method and apparatus which satisfies the needs discussed above and allows crusts or the like to be formed in a manner which visually duplicates a hand-woven, lattice-work pastry crust of the type generally referred to. In accordance with one aspect of the invention, there is provided an apparatus capable of forming a sheet of pastry dough to have a woven, lattice-work appearance and comprising a first array of elements constituting cutters for punching through a pastry dough sheet to produce a predetermined pattern of aligned, polygonal-shaped cut-out openings with at least some sides of each opening generally aligned with sides of adjacent openings. A second array of elements is provided constituting forming elements incapable of cutting through the dough sheets and positioned between the cutters in alignment with predetermined ones of the cutters for causing the dough sheet portions between the cut-out openings to be deformed inwardly from the top surface of the sheet to produce the appearance of being formed from interwoven and overlapping strips of dough sheet.

Preferably, and in accordance with a further aspect of the invention, the cutters and forming elements are mounted on a common, rigid support.

In accordance with a further aspect of the invention, there is provided a method of treating a sheet of pastry dough to cause it to have a woven, lattice-work appearance. The method comprises the steps of providing a sheet of pastry dough of relatively uniform thickness. Thereafter, a plurality of polygonal-shaped openings are cut through the sheet in a predetermined pattern with sides of each opening being aligned with sides of adjacent openings to produce aligned rows of openings. Between the openings the sheet is deformed by depressing grooves therein aligned with sides of the openings to make it appear that the sheet is comprised of overlapping dough strips.

Preferably, and in accordance with a more limited aspect of the invention, the openings formed through the sheet are formed simultaneously with the step of deforming the sheet in the portions remaining between the openings.

Ideally, certain of the portions remaining between the openings are deformed so as to have a tapering thickness to make it more nearly appear that the finished sheet is comprised of strips which pass over and under one another.

The method and apparatus of the invention can be practiced and embodied in manually operable cutting and forming devices or incorporated into high production, automatic machinery. In all aspects, however, the resulting product can be made to have the appearance nearly identical to that of a pastry product woven from individual separate strips of pasty dough. Moreover, a great increase in productivity can result through the use of the subject invention.

As can readily be seen from the foregoing, a primary object of the invention is to provide a method and apparatus for forming dough sheets to have a lattice-work appearance.

A further object is the provision of an apparatus of the type described which can be readily made to produce a variety of different patterns of interwoven appearance.

Yet another object is the provision of an apparatus of the general type described above which can be either manually or machine operated to produce the desired pastry product.

A further object of the invention is the provision of a method which is extremely simple to perform and which can be performed either manually or incorporated in machinery.

BRIEF DESCRIPTION OF THE DRAWINGS

The above and other objects and advantages will become apparent from the following description when read in conjunction with the accompanying drawings wherein:

FIG. 1 is a plan view of a pie having a top crust formed through the practice of the subject invention;

FIG. 1A is a cross-sectional view taken on line 1A—1A of FIG. 1;

FIG. 2 is a top plan view of a pie having a top crust formed using a second embodiment of the invention;

FIG. 2A is a cross-sectional view taken on line 2A—2A of FIG. 2;

FIG. 3 is a perspective view of an apparatus specifically intended for forming the top crust shown in FIG. 1;

FIG. 4 is a cross-sectional view taken on line 4—4 of FIG. 3;

FIG. 5 is a cross-sectional view taken on line 5—5 of FIG. 3; and,

DETAILED DESCRIPTION OF THE PREFERRED AND ALTERNATE EMBODIMENTS

Figure 6:
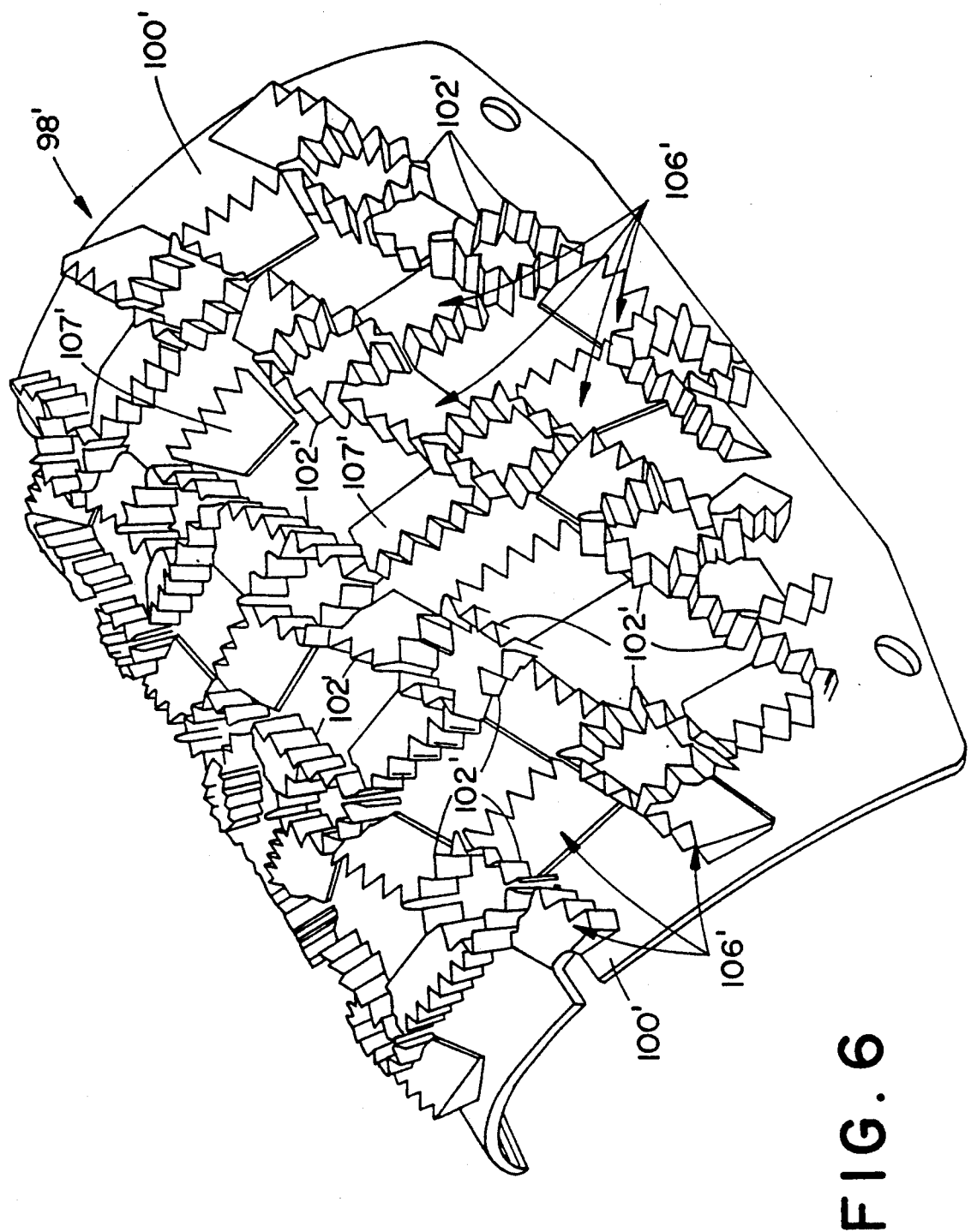
FIG. 6 is a perspective view of an apparatus formed in accordance with a second embodiment of the invention for forming a pie crust of the type shown in FIG. 2.

Referring more particularly to the drawings wherein the showings are for the purpose of illustrated preferred and alternate embodiments of the invention only, and not for the purpose of limiting same, FIG. 1 generally illustrates a pie 10 having a pastry sheet top crust 12 which is formed so as to have the appearance of a woven, lattice-work crust which seems to be formed from a plurality of individual, interwoven pasty dough strips. Specifically, the top crust 12 is formed from a single, continuous sheet of pastry and has a plurality of spaced and generally aligned, somewhat rectangular polygonal openings 14 formed therethrough. In the FIG. 1 embodiment, the openings 14 are laid out in a relatively regular pattern with the individual sides of each opening generally aligned with at least some of the sides of adjacent openings. Preferably, the openings 14 have the sides formed with a serrate or sinusoidal configuration. It should be appreciated, however, that other edge shapes including straight can equally well be used in the practice of the invention.

Of particular importance to the invention is the manner in which the sheet area between the openings is shaped and deformed so as to force the appearance of separate strips of interwoven pastry. In particular, it should be seen that the resulting appearance is that the crust is formed from four or five separate horizontal strips and five separate vertical strips. For the purposes of discussion, the horizontal strips have been generally identified with the numerals 15 through 19, while the vertically extending strip portions have been identified with the numerals 20 through 24. To achieve this appearance, the crust or pastry sheet material between the aligned polygonal openings 14 is deformed by depressing groove-like sections of V-like configuration downwardly into the sheet beneath the top surface thereof in general alignment with sides of adjacent openings 14. This can best be understood by, for example, noting that the lower edge 26 of the strip portion 17a has a delineation which is in alignment with the top edges of the two central openings 14. That portion of material lying above line 26 (as viewed in FIG. 1) is at an elevation relatively higher than the sheet material lying beneath line 26. This can be best seen in the cross-sectional view of FIG. 1A. As illustrated therein, line 26 is a juncture line between section 17a and the strip section 22a which is depressed downwardly adjacent line 26. The resulting appearance from the top of the sheet is that of separate, overlying or interwoven strips, but in reality, it is a single sheet having the noted deformation or groove formed therein. This technique is repeated through the sheet in the manner illustrated in FIG. 1 so as to provide the desired interwoven appearance.

FIG. 2 illustrates a further embodiment of the invention or, in the alternative, a second form of crust which can result through the use of the invention. Like reference numerals differentiated by a prime (') suffix have been used to identify the parts which correspond to those of FIG. 1. Specifically, as shown in FIG. 2, the top crust 12' of the pie 10' is provided with a multiplicity of generally aligned and uniformly spaced through openings 14' which have the general polygonal configuration of a regular parallelogram. Also in this embodiment, as in the embodiment of FIG. 1. the openings 14' generally have their edges formed with a serrate or sinusoidal pattern. In this embodiment, the individual strip sections which result between the openings 14' are somewhat narrower and, of course, lie at an angle other than the 90° angle in which the strips of the FIG. 1 embodiment lie. However, in other particulars, the FIG. 2 embodiment uses the same general approach in that the areas between the openings are deformed as shown by FIG. 2A to have formed edges in alignment with the edges of the adjacent openings to result in the appearance of the overlapping section. Note that in FIG. 2A, the strip section identified as 30 appears to extend over the strip section identified as 32. This appearance is, however, provided by the two depressed or grooved sections 34 and 36 which align with the sides of the adjacent openings 14'. It should also be noted that in both the FIG. 1 and FIG. 2 embodiment, the depressed portions intermediate the openings preferably are formed so as to provide a continuation of the serrated or sinusoidal edge shape on the openings 14 and 14'.

FIGS. 1 and 2 merely illustrate two possible different interwoven appearances which can result from the practice of the subject invention. It should be appreciated that other regular and known weaving patterns can equally well be duplicated through the practice of the subject invention. For example, hex-shaped openings could equally well be used and the resulting cheese basket type of pattern provided in the remaining intermediate sections.

Referring to FIGS. 3 through 5, there is illustrated an apparatus which is capable of directly producing the crossed pattern shown in FIG. 1 from a sheet of pastry dough of uniform thickness. Basically, the structure shown in FIGS. 3 through 5 comprises a relatively rigid base member 100 which, in this embodiment, is formed as a portion of a cylinder from any suitable relatively rigid structural material, either metal or plastic, for example. Joined to the base member and extending outwardly therefrom are a plurality of individual cutter elements 102 which are positioned about rectangular openings 104 formed through the base member 100. The cutter elements 102 and the openings 104 are laid out to correspond to the previously-mentioned openings 14 described with reference to FIG. 1. Thus, when the apparatus 98 is positioned over a sheet of pastry and rocked thereover in the manner of a rolling pin, the individual cutter elements 102 cut the pattern of openings 14 as described earlier.

The individual cutter elements 102 can be formed from metal, and it should be appreciated that their upper or cutting edges preferably all lie in the same effective plane to facilitate the rotation or movement of the apparatus 98 over the sheet in which the openings 14 are being formed. In this embodiment, the plane in which the cutting edges of the elements 102 lie would preferably be a cylindrical surface spaced outwardly a uniform distance from the base element 100.

It should be understood that the apparatus could equally well be incorporated in a flat conformation which would be simply reciprocated down into the pastry sheet.

Positioned between the cutting elements 102 and generally aligned with selected pairs of cutters 102 are a plurality of forming elements 106. Each of the elements 106 preferably has a generally wedge-shaped configuration as shown in FIGS. 3 and 4. An upper, inclined face 107 on the forming elements 106 is arranged so as to cooperate with the serrate vertically extending face los so as to produce the required deformation such as groove line 26 discussed with reference to FIG. 1. The intersecting line or edge between faces 107 and 108 is arranged so as to lie beneath or at a lower elevation from the base 100 as best seen in FIGS. 4 and 5. Thus, when the apparatus 98 is pressed into the dough sheet, the forming elements 106 cannot pass therethrough and must form the grooves as discussed and shown in FIG. 1A. The inclined surfaces 107 thus form the upwardly tapering top surface to make it appear that the particular strip portion engaged by surface 107 passes under the edge formed by the intersection of surfaces 107 and 108 on the forming elements 106.

FIG. 3 illustrates how the various forming elements 106 are laid out to produce the interwoven pattern illustrated in FIG. 1. Preferably, and as shown therein, the serrate faces 108 are formed and positioned so as to form a visual continuation of the serrated or sinusoidal edge cut on the openings 114 by the cutters or cutter elements 102.

FIG. 6 illustrates an apparatus closely similar to that described with reference to FIGS. 3 through 5. However, the FIG. 6 apparatus is arranged so as to form the woven pattern illustrated in FIG. 2. In all basic particulars, however, it is designed in the same manner as apparatus 98 of FIGS. 3 through 5. In the FIG. 6 showing, the apparatus 98' has the individual cutters or cutter elements 102' laid out in a pattern suitable for cutting the openings 14' of FIG. 2. These cutters are, of course, supported from a rigid base element 100' and lie at an angle such that they provide the inclined woven pattern shown in FIG. 2. The intermediate forming elements 106' are basically the same as elements 106 described in the FIG. 3 embodiment. Similarly, they have their upper edges formed at the intersection surfaces 107' and 108' located closer to the base element 100' than are the cutting edges 102'. In this regard, the apparatus is designed and functions in the same manner as the FIGS. 3 through 5 apparatus.

As can be seen from the foregoing, the relative sizes of the various through openings and strip appearing sections can vary widely from that shown in FIGS. 1 or 2. Likewise, the angle of inclination or the actual shape of the openings and their side walls can vary to allow variation in the final resulting crust appearance.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A method of treating a sheet of pastry dough to cause it to have a woven, lattice-work appearance comprising the steps of:
   a) providing a sheet of pastry dough of relatively uniform thickness;
   b) cutting a plurality of polygonal openings through the sheet in a predetermined pattern with sides of each opening being aligned with sides of adjacent openings to produce aligned rows of openings; and,
   c) deforming the sheet in the portions remaining between the openings by depressing grooves aligned with sides of the openings into the sheet to make it appear that the sheet is comprised of overlapping dough strips.

2. A method as defined in claim 1 comprising forming the openings simultaneously with step of deforming the sheet in the portions remaining between the openings.

3. A method as defined in claim 1 comprising cutting the polygonal openings with sinusoidal side edges.

4. A method as defined in claim 1 wherein the sheet is deformed in the portions remaining between the openings to have a non-uniform tapering thickness sections.

* * * * *